US009323548B2

(12) United States Patent
Yang

(10) Patent No.: US 9,323,548 B2
(45) Date of Patent: Apr. 26, 2016

(54) METHOD AND SYSTEM FOR PSEUDO-VIRTUALIZATION OF APPLICATION RUNNING ENVIRONMENT ON A HOST SERVER

(71) Applicant: MYRIAD GROUP AG, Zurich (CH)

(72) Inventor: Hang Yang, Chengdu Sichuan (CN)

(73) Assignee: MYRIAD GROUP AG, Zurich (CH)

(*) Notice: Subject to any disclaimer, the term of this patent is extended or adjusted under 35 U.S.C. 154(b) by 290 days.

(21) Appl. No.: 13/952,841

(22) Filed: Jul. 29, 2013

(65) Prior Publication Data

US 2014/0040894 A1   Feb. 6, 2014

(30) Foreign Application Priority Data

Jul. 31, 2012   (EP) .................................... 12305944

(51) Int. Cl.
*G06F 9/455* (2006.01)
*G06F 9/48* (2006.01)

(52) U.S. Cl.
CPC ............ *G06F 9/455* (2013.01); *G06F 9/45533* (2013.01); *G06F 9/4843* (2013.01); *G06F 2209/462* (2013.01)

(58) Field of Classification Search
None
See application file for complete search history.

(56) References Cited

U.S. PATENT DOCUMENTS

| | | | |
|---|---|---|---|
| 6,453,311 B1* | 9/2002 | Powers, III | |
| 7,962,545 B2* | 6/2011 | Knauerhase et al. | 709/203 |
| 8,204,082 B2* | 6/2012 | Jungck et al. | 370/498 |
| 8,365,156 B2* | 1/2013 | Sollich | 717/146 |
| 8,700,804 B1* | 4/2014 | Meyers et al. | 709/248 |
| 2002/0173984 A1 | 11/2002 | Robertson et al. | |
| 2004/0128670 A1 | 7/2004 | Robinson et al. | |

OTHER PUBLICATIONS

European Search Report dated Feb. 4, 2013, corresponding to the Foreign Priority Application No. 12 30 5944.
"SiteScope User's Guide"; Internet Citation; Jul. 8, 2001; XP002290697.
"UDDI Technical White Paper"; Internet Citation; Sep. 6, 2000; XP002230398.

* cited by examiner

*Primary Examiner* — Van Nguyen
(74) *Attorney, Agent, or Firm* — Young & Thompson

(57) ABSTRACT

A method and system for running multiple instances of a computer application into a virtual environment on a host server, and more specifically for running multiple instances of an operating system such as a mobile devices operating system, on the internet cloud. The method includes launching a global service manager, and having this service manager querying a binder driver which handles interprocess communications, so that the global service manager becomes a binder context manager for managing the running of multiple instances of the computer application into a virtual running environment. The method also includes launching, when launching any instance of the application after launch of the global service manager, a local service manager for handling service management for the instance of the application into a pseudo-virtual environment, the local service manager being registered by the binder context manager as local service manager for the instance of the application.

14 Claims, 2 Drawing Sheets

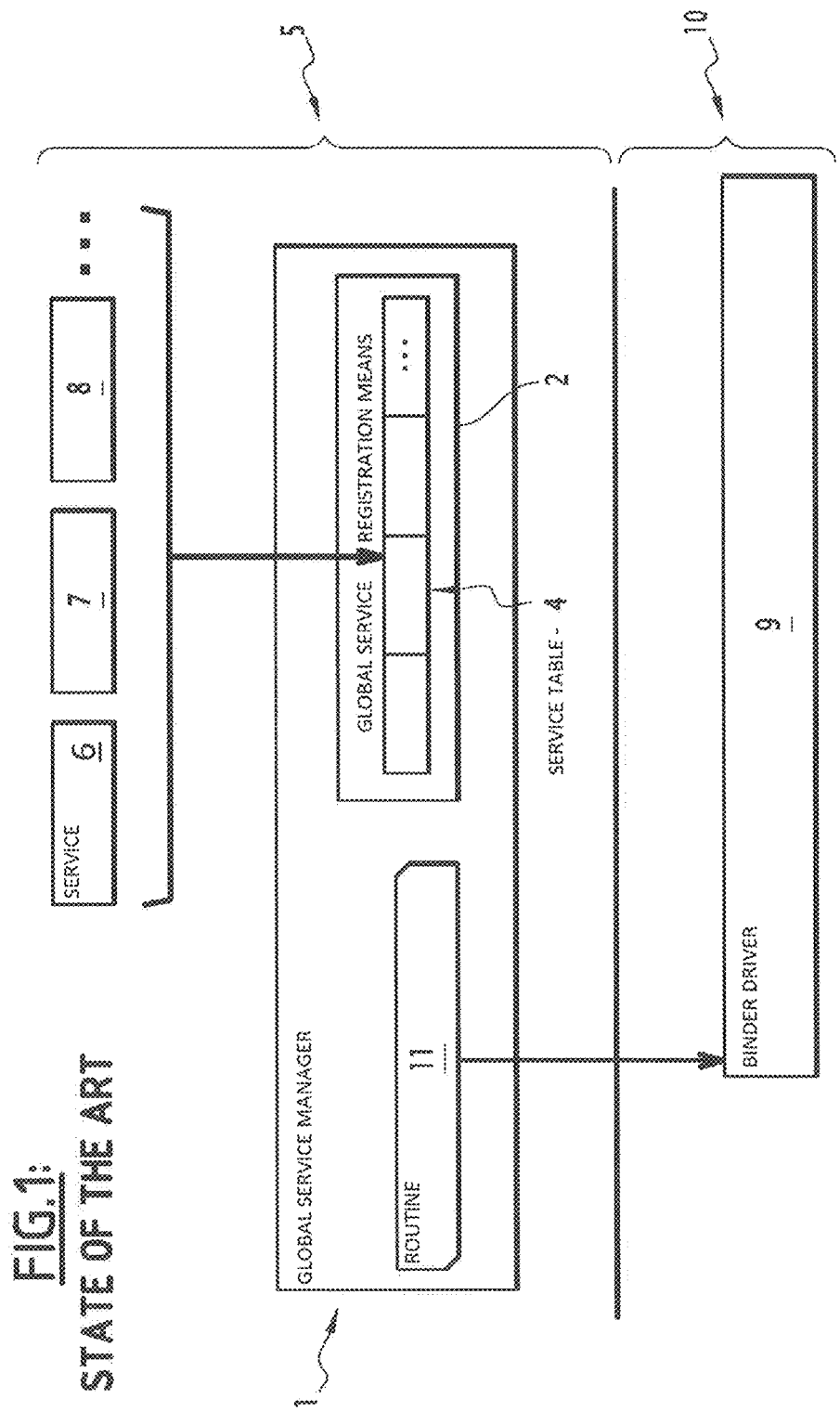

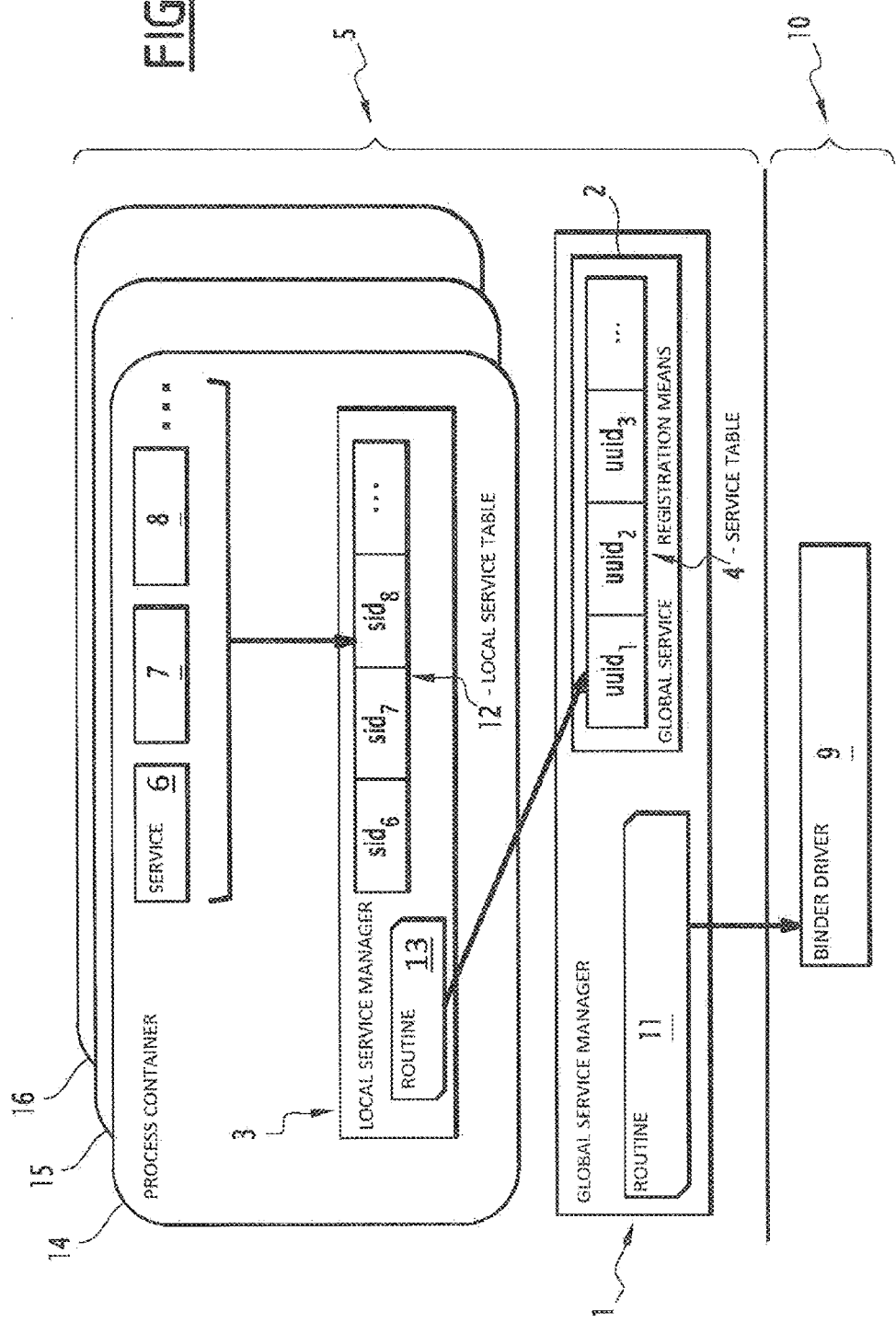

METHOD AND SYSTEM FOR PSEUDO-VIRTUALIZATION OF APPLICATION RUNNING ENVIRONMENT ON A HOST SERVER

The present invention relates to a method and a system for running multiple instances of a computer application into a virtual environment on a host server, and more specifically for running multiple instances of an operating system application such as a mobile devices operating system, on the internet cloud.

BACKGROUND OF THE INVENTION

In this internet cloud, some users may connect to the internet through a device, such as a mobile device, in order to run applications remotely, this application being run on a distant host server.

By application, or computer application, is meant either an operating system application, such as a mobile devices operating system, or an application to be executed on such an operating system. In order to run the application, the operating system has of course to be launched and run.

In order to be able to run an application on a host server, one may use so-called virtualization techniques.

The principle of such techniques is to create a virtual running environment onto the host server to be able to run a specific application, which running environment is clearly separated from any other virtual environment created for running any other application.

Running an application can be regarded as running one process in a system handling inter-process communication (IPC). For security or safety reasons, one process must not manipulate the data of another process. Therefore, processes must be isolated from each other, which goal is achieved by the use of virtualization and virtual environments or virtual machines.

For example, each process is assigned the access to one specific memory space in the virtual memory, this virtual memory space being mapped to the physical memory. Each process having thus its own virtual memory space, a process cannot manipulate the memory space of another process.

In some circumstances, one may desire running multiple instances of an application on a host server. This can be the case, for example, when one wants to allow multiple users of mobile devices to remotely test an application before downloading this application into their device.

Or this can be also the case, for example, when one wants to allow the running of applications designed to run on a specific operating system, onto a host server using itself another operating system.

In the above two paragraphs, by application is meant an end-user application which is due to run on an operating system which itself is regarded as an application too. To allow running these end-user applications on the host server and its operating system, one must be able to run on the host server multiple instances of the operating system corresponding to these end-user applications.

One way to do so is to use full virtualization, with emulation of the application (or operating system). This means that every instance of the application runs on its own kernel onto the host server, within the fully virtualized environment.

Such a state of the art virtual running environment or virtual machine may be briefly illustrated as in FIG. 1.

In the client side 5, or user space 5, of a host server, a service manager 1 is launched when the application such as the mobile operating system is launched. This service manager 1 becomes a context manager 1, and comprises a service registration means r 2 with a service table 4, which registers the services 6, 7, 8.

More precisely, the services 6, 7, 8 register themselves, when needed, into the service table 4 of the service registration means 2 into the context manager 1.

To become the context manager 1, the service manager 1 notifies the so-called binder driver 9 into the kernel space 10 of the host server, by calling an appropriate routine 11. This binder driver 9 effectively handles IPC, so that the process corresponding to the application running into user space 5 can communicate with other processes corresponding to other applications.

However, there usually can be only one context manager 1 running at a time for a given application instance, which prohibits concurrent multiple running of same application instances.

Even if it is possible to run multiple instances of an application, such as an operating system, in full virtualization, this usually comes along with memory overhead and performance penalty.

There are possibilities of reducing the memory overhead and performance limitation problems, by entering a so-called light-weight virtualization, into which the same operating system kernel is shared. However, the service manager 1 is started during the early boot up process of the operating system application. This service manager 2 becomes, as such, a global service manager which handles service registration/unregistration/query from other processes, and talk to the binder driver 9 to become a binder context manager.

All service 6, 7, 8 are then identified by their respective names into the service table 4 of the service registration means 2 in the binder context manager 1. Registering a service with a duplicated name will fail.

It is therefore not possible to launch more than one instance of the operating system application onto the host server.

In fact, any process being the first one to talk to the binder driver 9 becomes the binder context manager 1.

This binder context manager 1 can then be queried by other processes, by the use of a special fixed identifier, usually 0, via the binder driver 9.

In some systems, such as some known mobile device operating systems, the service manager 1, started at early stage of system bootup, requests to become the binder context manager 1.

This service manager 1 can be considered as a special service offering service management, such as registration, unregistration or querying. Other services or applications processes communicate with the service manager 1 via the binder driver 9 to use its special service.

There can thus be only one single binder context manager 1, or one single global service manager 1 which became in fact the binder context manager 1, running on host.

The invention provides a solution to these problems, with a method and a system for running multiple instances of a computer application, such as an operating system, into a virtual environment on a host server.

SUMMARY OF THE INVENTION

The method comprises therefore the steps of launching a global service manager, having the global service manager querying a binder driver which handles interprocess communications, so that the global service manager becomes a binder context manager for managing the running of the multiple instances of the computer application into a virtual running environment.

The method comprises also the step of launching a local service manager, when launching any instance of said application after launch of said global service manager. The local service manager handles service management for the instance of the application into a pseudo-virtual environment. This local service manager is registered by the binder context manager as local service manager for said instance of the application.

In one embodiment, the local service manager registers itself as a service into a global service registration means of the global context manager The global service registration means may comprise a global service table. Registration of the local service manager into the global service registration means comprising registration of the local service manager into the global service table.

Moreover, registration of the local service manager into the global service table may comprise allocation of a unique identifier by the binder context manager to the local service manager, and registration of this unique identifier into the global service table.

Preferably, a cleaning step is periodically performed for cleaning the global service table from non-living local service manager.

The invention relates also to a computer program product stored on a storage medium and comprising a set of instructions loadable into the memory of a computer, such that, when the set of instructions is executed on the computer, the product performs the method as presented above.

The invention relates again to a host server in a computer environment, comprising a bus, a memory connected to the bus and comprising a set of instructions loaded into it, and a processing unit connected to the bus.

The processing unit is able, by executing the set of instructions, to launch a global service manager, and to have the global service manager querying a binder driver which is able to handle interprocess communications, so that the global service manager becomes a binder context manager for managing the running of multiple instances of a computer application, such as a mobile operating system, into a virtual running environment.

The processing unit is also able, when any instance of the application is launched, to launch a local service manager handling service management for the instance of the application into a pseudo-virtual environment, and to have the binder context manager registering the local service manager as local service manager for the instance of the application.

In one embodiment, the binder context manager comprises a global service registration means, and the processing unit is able to register the local service manager as a service into the global service registration means of the binder context manager.

The global service registration means may comprise a global service table, the processing unit being able to register the local service manager into the global service table.

The processing unit may be able to allocate a unique identifier to the local service manager, and to register this unique identifier into the global service table.

Preferably, the processing unit is able to periodically clean the global service table from non-living local service managers.

Therefore, the distinction between the single global service manager or binder context manager on one hand, and local service managers on the other hand, allows to solve the conflict issue encountered with state of the art solutions which prohibits running of multiple instances of the same operating system application on a host server.

BRIEF DESCRIPTION OF THE DRAWINGS

The invention will be better understood, and other features and advantages of the invention will become more apparent, by referring, for the sole purpose of non-limitative example, to the following description and the annexed drawings in which:

FIG. 1 is an illustration of a state of the art virtualization technique

FIG. 2 is an illustration of an example of pseudo-virtualization according to the invention

DETAILED DESCRIPTION OF THE PREFERRED EMBODIMENTS

FIG. 1 referring to the state of the art has been already described above.

The example of pseudo-virtualization according to the invention illustrated in FIG. 2, relates to running three instances of an operating system application into the user space 5 of a host server. A global service manager 1 is started on the host, into the user space 5, before launching any instance of the application.

This global service manager 1 is the first one communicating, through the appropriate routine 11, with the binder driver 9 located into the kernel space 10 of the host server and which handles interprocess communications. Both binder driver 9 and routine 11 have been already described above with reference to FIG. 1.

The global service manager 1 becomes therefore de facto the binder context manager 1. When launching an instance of the operating system application, a local service manager 3 is started, preferably within a process container 14. In the example illustrated in FIG. 2, three instances of the operating system application are launched within three different process containers 14, 15, 16.

Each of the local service managers 3 registers itself as a service into the global service registration means 2 of the binder context manager 1.

For example, the local service manager 3, into the process container 14, registers itself as a service, via the appropriate routine 13, into the service table 4 of the global service registration means 2.

This registration of the local service manager 3 as a service into the service table 4 is done using a generated-on-the-fly unique identifier $uuid_1$ as a name.

Thus the local service manager 3 becomes a special service, registered into the global service table 4 of the binder context manager 1, which handles service registration/unregistration/query within one instance of the operating system application.

This is the same for other local service managers for other instances of the operating system application in the other process containers 15, 16. These are respectively registered as special services into the global service table 4, with unique identifiers $uuid_2$ and $uuid_3$.

The global service table 4 becomes therefore a sub-context manager table 4.

Each local service manager 3 is then able to register any required services 6, 7, 8 in a local service table 12, with respective identifiers $sid_6$, $sid_7$ and $sid_8$, irrespective of the fact that these services 6, 7, 8 are already registered or not into the local service table of other local service managers corresponding to other instances of the operating system application.

The invention claimed is:

1. A method for running multiple instances of a computer application on a host server, comprising the steps of:
   launching a global service manager;
   having the global service manager query a binder driver for handling interprocess communications, wherein the global service manager handles any of service registration, service unregistration, and service query from other processes; and
   when launching an instance of the computer application after launching said global service manager, performing the steps of:
   launching an associated local service manager for managing services provided by said instance of the computer application,
   placing the instance of the computer application into a process container, and
   registering, at the global service manager, said associated local service manager as a local service manager for said instance of the computer application.

2. The method of claim 1, wherein the associated local service manager registers itself as a service into a global service registration means of the global service manager.

3. The method of claim 2, wherein,
   the global service registration means comprises a global service table, and
   registration of the associated local service manager into the global service registration means comprises registration of said associated local service manager into said global service table.

4. The method of claim 3, wherein registration of the associated local service manager into the global service table comprises the steps of:
   allocating, by way of the global service manager, a unique identifier to said associated local service manager; and
   registering said unique identifier into the global service table.

5. The method of claim 4, further comprising:
   periodically cleaning the global service table of non-living local service managers.

6. The method of claim 3, further comprising:
   cleaning the global service table of non-living local service managers,
   said step of cleaning the global service table being performed periodically.

7. A computer program product stored on a non-transitory storage medium and comprising a set of instructions loadable into a memory of a computer, wherein, when said set of instructions is executed on said computer, said product performs the method of claim 1.

8. The method of claim 1, wherein the computer application is a mobile operating system.

9. A host server in a computer environment for running multiple instances of a computer application, comprising:
   a bus;
   a memory connected to the bus; and
   a processing unit connected to the bus, said processing unit being configured to launch a global service manager, to have the global service manager query a binder driver for handling interprocess communications,
   wherein the global service manager handles any of service registration, service unregistration, and service query from other processes, and
   wherein said processing unit is configured, when an instance of the computer application is launched after launching said global service manager:
   to launch an associated local service manager for managing services provided by said instance of the computer application,
   to place the instance of the computer application into a process container, and
   to have the global service manager register said associated local service manager as a local service manager for said instance of the computer application.

10. The server of claim 9, wherein the global service manager comprises a global service registration means, and the processing unit is configured to register the local service manager as a service into the global service registration means of the global service manager.

11. The server of claim 10, wherein,
    the global service registration means comprises a global service table, and
    the processing unit is configured to register the local service manager into said global service table.

12. The server of claim 11, wherein the processing unit allocates a unique identifier to the local service manager, and registers said unique identifier into the global service table.

13. The server of claim 11, wherein the processing unit periodically cleans the global service table of non-living local service managers.

14. The server of claim 12, wherein the processing unit periodically cleans the global service table of non-living local service managers.

* * * * *